US012595174B2

(12) United States Patent
Joucla et al.

(10) Patent No.: US 12,595,174 B2
(45) Date of Patent: Apr. 7, 2026

(54) METHOD FOR PRODUCING THE PENTAZOLATE ANION USING A HYPERVALENT IODINE OXIDANT

(71) Applicants: ARIANEGROUP SAS, Les Mureaux (FR); CENTRE NATIONAL DE LA RECHERCHE SCIENTIFIQUE, Paris (FR); UNIVERSITE CLAUDE BERNARD LYON 1, Villeurbanne (FR)

(72) Inventors: Lionel Joucla, Vert-le-Petit (FR); Gwénaël Gasnier, Vert-le-Petit (FR); Sébastien Comte, Vert-le-Petit (FR); Raphaël Silva Costa, Vert-le-Petit (FR)

(73) Assignees: ARIANEGROUP SAS, Les Mureaux (FR); CENTRE NATIONAL DE LA RECHERCHE SCIENTIFIQUE, Paris Cedex (FR)

( * ) Notice: Subject to any disclaimer, the term of this patent is extended or adjusted under 35 U.S.C. 154(b) by 233 days.

(21) Appl. No.: 18/688,565

(22) PCT Filed: Aug. 30, 2022

(86) PCT No.: PCT/FR2022/051632

§ 371 (c)(1),
(2) Date: Mar. 1, 2024

(87) PCT Pub. No.: WO2023/031552

PCT Pub. Date: Mar. 9, 2023

(65) Prior Publication Data

US 2024/0391772 A1 Nov. 28, 2024

(30) Foreign Application Priority Data

Sep. 3, 2021 (FR) ....................................... 2109197

(51) Int. Cl.
*C01B 21/00* (2006.01)
*C06B 43/00* (2006.01)

(52) U.S. Cl.
CPC .............. *C01B 21/00* (2013.01); *C06B 43/00* (2013.01)

(58) Field of Classification Search
None
See application file for complete search history.

(56) References Cited

U.S. PATENT DOCUMENTS

2014/0373984 A1* 12/2014 McCrary ................ C06B 47/10 548/110
2016/0177698 A1* 6/2016 Schultheiss ............ C09K 8/805 166/305.1

FOREIGN PATENT DOCUMENTS

CN 106518797 A 3/2017
CN 106748602 A 5/2017
CN 107365277 A 11/2017

OTHER PUBLICATIONS

Hybrid of tetrazolium and pentazolate (Year: 2023).*
International Search Report as issued in International Patent Application No. PCT/FR2022/051632, dated Dec. 12, 2022.

(Continued)

*Primary Examiner* — Aileen B Felton
(74) *Attorney, Agent, or Firm* — CUSHMAN PARTNERS

(57) ABSTRACT

A method for producing the pentazolate anion, includes at least the oxidation of a phenolic arylpentazole by a particular hypervalent iodine oxidant in the presence of a base.

9 Claims, 2 Drawing Sheets

(56) References Cited

OTHER PUBLICATIONS

Xu, Y., et al., "A series of energetic metal pentazolate hydrates," Nature, vol. 549, No. 7670, Sep. 2017, XP055901398, Retrieved from the Internet: URL:https://www.nature.com/articles/nature23662.pdf, pp. 78-81.
Zhang C., et a., "Synthesis and characterization of the pentazolate anion cyclo-$N_5$ in $(N_5)6(H_3O)_3(NH_4)_4CI$," Science, vol. 355, No. 6323, Jan. 2017, XP055901462, Retrieved from the Internet: URL:http://dx.doi.org/10.1126/science.aah3840, pp. 374-376.

* cited by examiner

[Fig. 1]
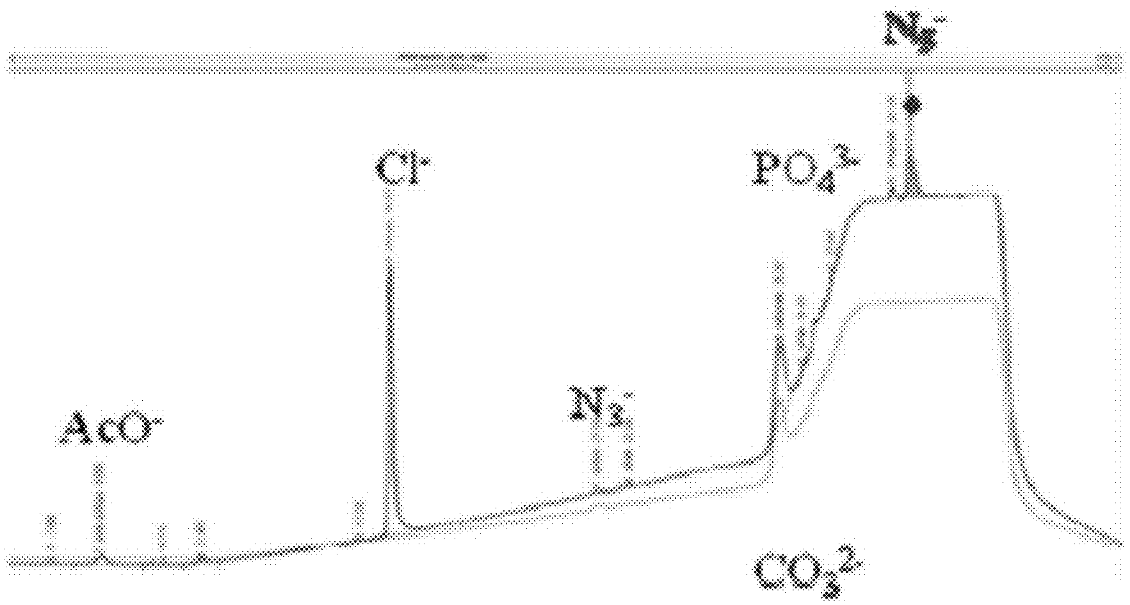
[Fig. 2]
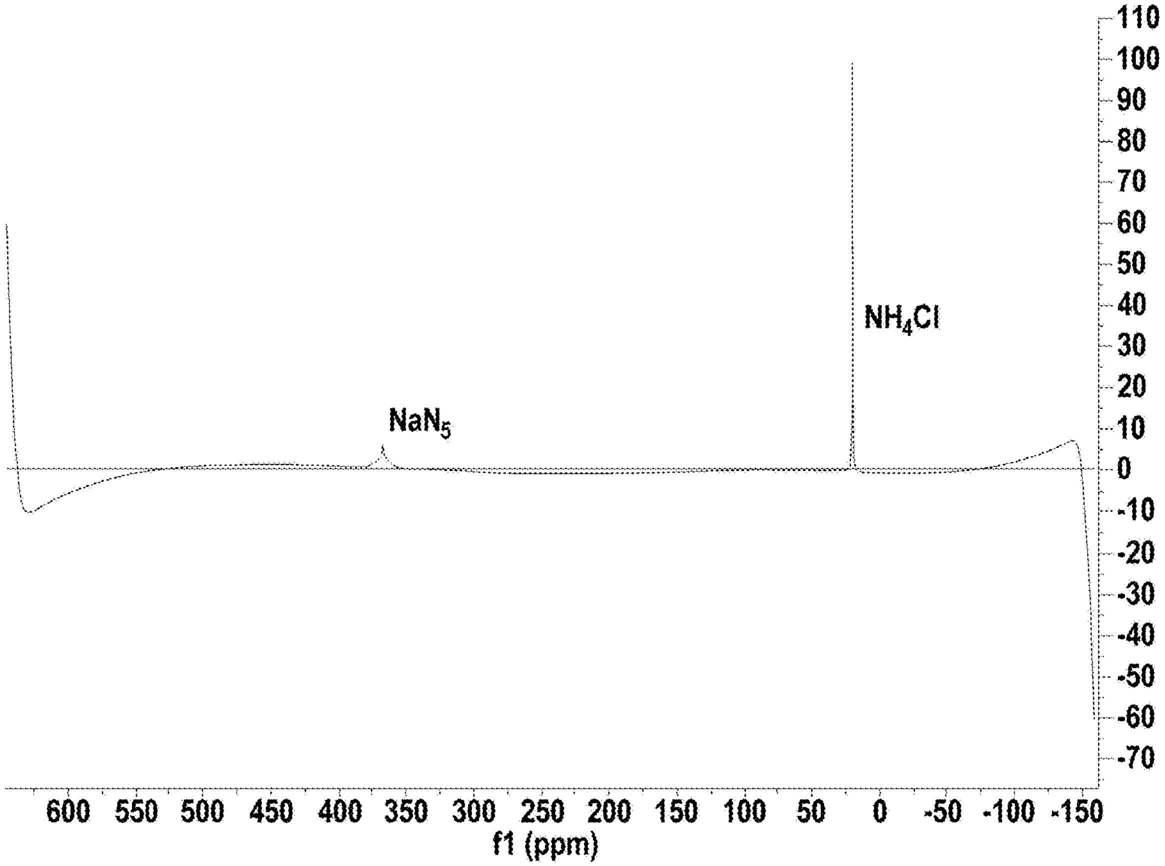

[Fig. 3]
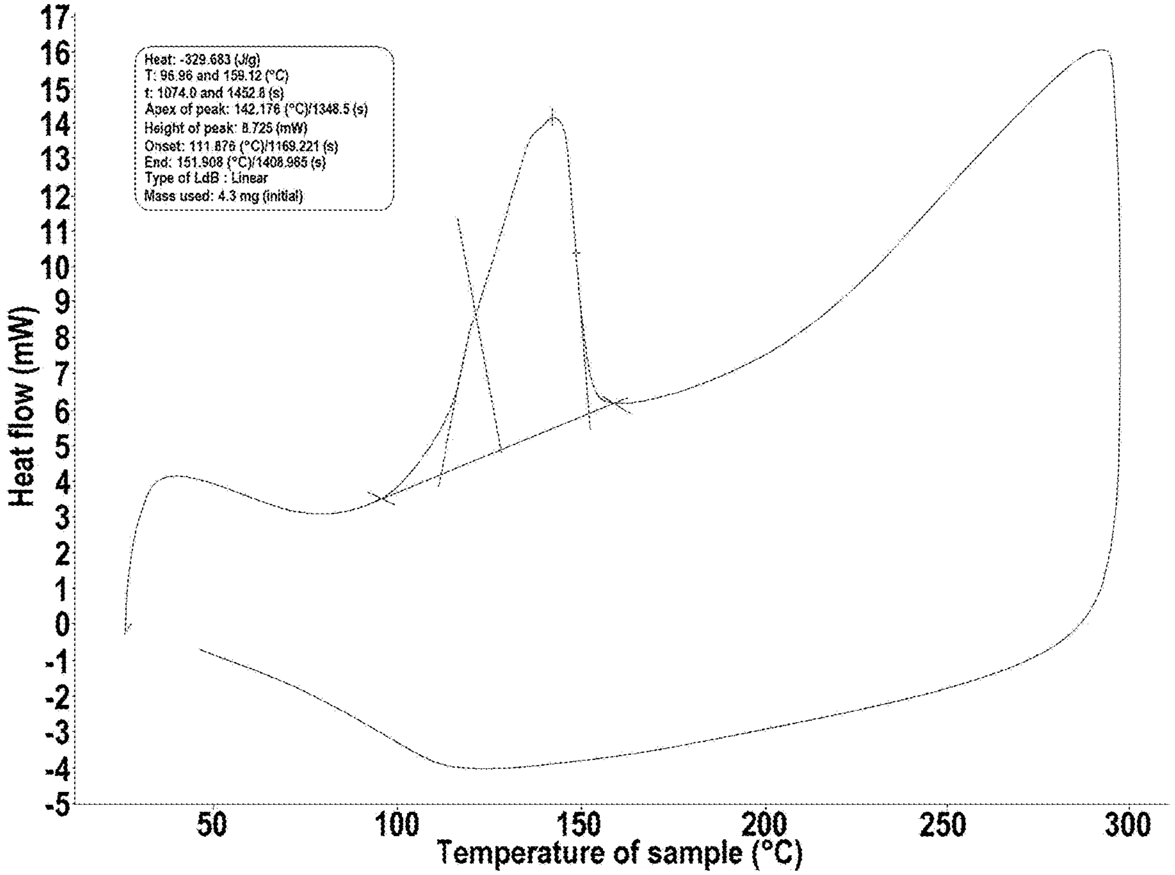

METHOD FOR PRODUCING THE PENTAZOLATE ANION USING A HYPERVALENT IODINE OXIDANT

CROSS-REFERENCE TO RELATED APPLICATIONS

This application is the U.S. National Stage of PCT/FR2022/051632, filed Aug. 30, 2022, which in turn claims priority to French patent application number 21 09197 filed Sep. 3, 2021. The content of these applications are incorporated herein by reference in their entireties.

TECHNICAL FIELD

The present invention relates to a method for producing the pentazolate anion (cyclo-$N_5^-$) using a hypervalent iodine oxidant. The pentazolate anion has the formula given below.

[Chem. 1]

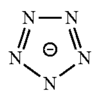

The present invention also relates to the preparation of an energetic composition based on the resulting pentazolate anion.

PRIOR ART

The search for novel energetic, oxidising or explosive charges, has until now been carried out by the functionalisation of carbon-containing structures with explosophore groups, for example of the nitride ($N_3$), nitrate ($O—NO_2$) or nitramine ($N—NO_2$) type. This approach has now reached a ceiling in terms of internal energy. It is therefore desirable to find new molecules with a high energy density. The pentazolate anion has been identified in the literature as a promising compound in this respect, for both civil propulsion and military applications. The preparation of the pentazolate anion was described for the first time in 2017 by the group of Zhang [Science, 2017, 355, 374-376]. This work proposed oxidising a phenolic arylpentazole using an oxidant system based on an iron (II) organometallic derivative and an excess of metachloroperoxybenzoic acid (m-CPBA). The use of the peroxyacid m-CPBA nevertheless poses safety problems and requires a relatively complex purification by chromatography over silica gel. It is also desirable to improve the reproducibility of this synthesis as well as the yields obtained, which are of order 5% to 15%.

DISCLOSURE OF THE INVENTION

The invention relates to a method for producing the pentazolate anion, comprising at least:

oxidation of a phenolic arylpentazole by a hypervalent iodine oxidant in the presence of a base, said hypervalent iodine oxidant being of general formula A-B where group A designates a benzene ring, and group B is a structure comprising a hypervalent iodine atom having one of the two formulas B1 or B2 below:

[Chem. 2]

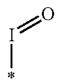

B1

[Chem. 3]

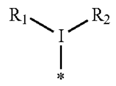

B2 with *— designating, in the formulas B1 and B2, the bond of the hypervalent iodine atom to the benzene ring A, in formula B2, $R_1$ and $R_2$ being identical or different and chosen independently of one another from: —OCOR, —OR, where R designates a linear or branched, alkyl chain comprising between 1 and 4 carbon atoms, or $R_1$ being —OH and $R_2$ being —OTs with Ts designating a tosyl group, where **— designates the bond of the oxygen atom to the hypervalent iodine atom.

In the following, for conciseness, the expression "hypervalent iodine oxidant" will be designated by "oxidant".

The base enables a proton to be removed from the —OH functional group of the phenolic arylpentazole in order to produce the oxidation. In formula B2, $R_1$ and $R_2$ are advantageously identical.

The invention is remarkable in that it proposes using a particular oxidant in order to obtain the pentazolate anion from a phenolic arylpentazole, avoiding, in particular, the use of m-CPBA in the prior art. The invention thus provides a safer synthesis, as well as reproducible yields. The oxidant used also enables the purification to be simplified compared with the prior art, by making possible a simple liquid-liquid extraction in order to remove the oxidant residues, which makes it possible to scale-up production.

In an exemplary embodiment, the oxidation is carried out in a solvent comprising hexafluoroisopropanol and at least one compound chosen from alcohols or acetonitrile.

The use of this solvent improves the yield of the pentazolate anion formation because it facilitates depolymerisation of the oxidant, thus activating oxidation of the phenolic arylpentazole.

In particular, the oxidation can be carried out in a solvent comprising hexafluoroisopropanol and methanol (MeOH).

The oxidation can generally be carried out in a perfluorinated solvent which may be different from HFIP such as trifluoroethanol (TFE). In general, the oxidation can be carried out in a mixture of an alcohol, such as methanol (MeOH), and perfluorinated solvent or acetonitrile.

In an exemplary embodiment, group B is of formula B1.

This type of oxidant limits the generation of contaminant salts when compared with the use of the group of formula B2, further simplifying the isolation and purification of the resulting pentazolate anion.

In this case, the oxidant can be, in particular, iodosylbenzene (PhIO), the formula of which is given below.

[Chem. 4]

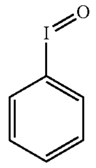

In an exemplary embodiment, the group B is of formula B1 and the oxidation is carried out in a solvent comprising hexafluoroisopropanol and at least one compound chosen from alcohols or acetonitrile.

This feature advantageously makes it possible to obtain a particularly high pentazolate anion formation yield compared with the yields of the prior art, which can be increased by up to 50%.

Alternatively, group B is of formula B2 and can have the general formula below.

[Chem. 5]

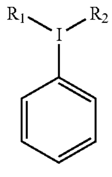

The alkyl chain R, which can be made an integral part of the substituents $R_1$ and $R_2$ described above, can be non-substituted.

According to one example, group B is of formula B2 with $R_1$ and $R_2$ identical and each designating —OCOMe or —OMe, where Me designates a methyl group.

In particular, the oxidant can be iodobenzene diacetate (PIDA), the formula of which is given below.

[Chem. 6]

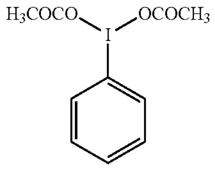

Other groups of formula B2 are possible with, for example, $R_1$ and $R_2$ identical and each designating **—OCOBBu, where tBu designates a tertbutyl group.

According to another alternative, Koser's reagent can be used as oxidant, the formula of which is given below, with Ts corresponding to the tosyl group:

[Chem. 7]

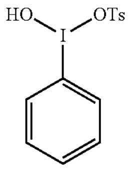

Whatever its structure, the oxidant can be obtained by techniques known per se, for example from the corresponding aryl halide or from a simple aromatic derivative. The two equations below illustrate, by way of example, these two synthesis paths for the formation of the oxidant PIDA.

[Chem. 8]

$$C_6H_5I+CH_3CO_3H+CH_3CO_2H \rightarrow C_6H_5I(O_2CCH_3)_2+H_2O \quad \text{Path 1}$$

$$C_6H_6+I_2+2CH_3CO_2H+K_2S_2O_8 \rightarrow C_6H_5I(O_2CCH_3)_2+KI+H_2SO_4+KHSO_4 \quad \text{Path 2}$$

In an exemplary embodiment, the base comprises at least one compound chosen from: an alkali hydroxide, an alkaline-earth hydroxide, a metal hydroxide, ammonium hydroxide, a quaternary ammonium hydroxide, an alkali carbonate or a mixture of these compounds.

The use of a base comprising a hydroxide ion is advantageous because it limits the generation of contaminating products compared with the use of alkali carbonate bases. Nevertheless, the use of carbonate bases remains within the scope of the invention.

In particular, the base can be sodium hydroxide (NaOH). As an alternative or in combination, the base can comprise lithium hydroxide (LiOH), potassium hydroxide (KOH), calcium hydroxide $Ca(OH)_2$, magnesium hydroxide $Mg(OH)_2$, aluminium hydroxide $Al(OH)_3$ or barium hydroxide ($Ba(OH)_2$).

The oxidation can be carried out by implementing the following successive steps:

- dissolving the base in an alcohol, for example in methanol, at a first temperature between 10° C. and 30° C., for example at ambient temperature (20° C.),
- adding a perfluorinated solvent, for example HFIP or TFE, and/or acetonitrile, this addition being carried out at the first temperature,
- cooling the mixture to a second temperature lower than the first temperature and between −60° C. and −20° C., for example equal to −40° C.,
- adding, at the second temperature, the phenolic arylpentazole and the oxidant, the oxidant being added by portions,
- stirring the resulting mixture at the second temperature for a period between 8 hours and 48 hours, for example for 24 hours,
- gradually raising the temperature of the mixture, for example to the first temperature, with at least one plateau at a third temperature higher than the second temperature and less than the first temperature, the third temperature being between −40° C. and 0° C., for example equal to −20° C., and remaining at this third temperature for a period between 8 hours and 48 hours, for example 24 hours, and optionally with an additional plateau at a fourth temperature, higher than the third temperature and less than the first temperature, the fourth temperature being between −20° C. and 20° C., for example at 0° C., and remaining at this fourth temperature for a period between 8 hours and 48 hours, for example 24 hours.

The oxidant is present in at least one equivalent, for example between one and five equivalents, or even between two and four equivalents, preferably approximately 3 equivalents, relative to the phenolic arylpentazole. The base is present in at least one equivalent, for example between one and five equivalents, relative to the phenolic arylpentazole. The relative quantities are taken before the start of oxidation.

The phenolic arylpentazole can be obtained by techniques that are known per se. It can, in general, have the following chemical structure:

[Chem. 9]

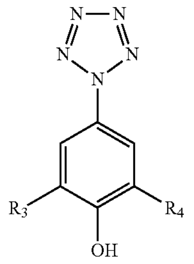

In the formula above, $R_3$ and $R_4$ are identical or different and chosen independently of one another from: the linear or branched, alkyl chains comprising between 1 and 4 carbon atoms, not substituted or substituted by a $C_1$ or $C_2$ alkoxy group or by a dialkylamine. $R_3$ and $R_4$ are preferably not substituted. $R_3$ and $R_4$ can each be a methyl or ethyl group.

In an exemplary embodiment, the oxidation is carried out in a solvent and the method further comprises, successively:

- removal of the solvent,
- liquid-liquid extraction, using an extraction solvent, in order to remove the oxidant residues,
- removal of the extraction solvent, and
- selective extraction of the pentazolate anion after this removal, the pentazolate anion being selectively extracted in a liquid medium comprising at least one of ethanol, acetonitrile or acetone, or a mixture of these compounds.

The invention advantageously enables a simple separation of the pentazolate anion from the other compounds present, such as sodium chloride (NaCl) which can come from the phenolic arylpentazole generation step preceding the oxidation. This selective extraction can be carried out at ambient temperature (20° C.). Acetonitrile and/or acetone can preferably be used to carry out this selective extraction.

The invention also relates to a method for producing an energetic composition, comprising at least the production of the pentazolate anion by the method described above, and mixing of the pentazolate anion thus produced with a binder in order to obtain the energetic composition.

BRIEF DESCRIPTION OF THE FIGURES

FIG. 1 is a result from an analysis by ionic chromatography, carried out after implementing an example of the method according to the invention, this figure highlights the presence of the pentazolate anion.

FIG. 2 is a result from an analysis by $^{14}N$ NMR, with external calibration with $NH_4Cl$, carried out after implementing an example of the method according to the invention.

FIG. 3 is a result from an analysis by differential scanning calorimetry, carried out after implementing an example of the method according to the invention.

EXAMPLES

Preparation of the arylpentazole precursor (catalytic reduction of 2,6-dimethyl-4-nitrophenol)

In a 1-L three-necked flask, palladium on carbon (Pd/C, 10% by mass, 240 mg) is placed in suspension in 44 mL of distilled water, the system is then swept with argon. A solution of sodium borohydride ($NaBH_4$) (4.54 g, 120 mmol) in 100 ml of a solution of sodium hydroxide (NaOH) 0.1 N is added dropwise (for approximately 20 minutes) at ambient temperature (20° C.). A solution formed of 2,6-dimethyl-4-nitrophenol (10.00 g, 60 mmol) in 360 mL of an aqueous solution of NaOH 1N (solution heated to 40° C. to facilitate the solubilisation) is then added dropwise (for approximately 60 minutes). The reaction medium is stirred at ambient temperature for 4 hours then filtered over celite (washing with water). An aqueous solution of hydrochloric acid (HCl) 3N (400 mL) is added to the filtrate, then the latter is washed with 3*100 mL ethyl acetate (EtOAc). The aqueous phase is concentrated (~80 mL), then 100 mL of a 37% HCl solution are added. The solution is placed in the refrigerator overnight, then the precipitate is filtered. This precipitate is dissolved in 200 ml of distilled water, then this solution is neutralised by addition of sodium hydrogencarbonate ($NaHCO_3$) to a pH~7/8. The aqueous phase is extracted by 3*100 mL of EtOAc, then the combined organic phases are dried on magnesium sulfate ($MgSO_4$), filtered and evaporated until dry. The product is obtained in the form of a violet solid corresponding to 3,5-dimethyl-4-hydroxyaniline (7.35 g, 91%).

Preparation of the Arylpentazole Precursor (Diazotation then Aziding)

In a 250-mL three-necked flask, 3,5-dimethyl-4-hydroxyaniline (3.00 g, 22 mmol, Eq. 1) is dissolved in 17 mL of tetrahydrofurane (THF), then the solution is cooled to −5° C. A solution of 37% HCl (3.25 mL, 40 mmol, 1.8 eq.) is then added dropwise while controlling the heat release. A solution of sodium nitrite ($NaNO_2$) (1.59 g, 23 mmol, 1.05 eq.) in 8 mL of a $MeOH/H_2O$ (1/1 v/v) mixture is then added dropwise while maintaining the temperature of the reaction medium below −2° C. After the end of the addition, the reaction medium is stirred at −5° C. for 30 minutes then cooled to −40° C. Then 75 mL of a MeOH/heptane (1/2 v/v) mixture, cooled beforehand to −40° C., is added in one go, then the stirring is increased in order to create an emulsion. A solution, cooled beforehand to −40° C., of sodium nitride ($NaN_3$) (1.50 g, 23 mmol, 1 eq.) in 8 mL of a $MeOH/H_2O$ (1/3 v/v) mixture is then added dropwise. After 15 minutes stirring at −40° C., the solution is filtered over a double-envelope frit maintained at −40° C. The phenolic arylpentazole product is obtained in the form of a violet solid and stored in a plastic bottle at −196° C. An analysis by 1H NMR (400 MHZ, $CD_3OD$) generally shows a ratio of $ArN_5/ArN_3$ of approximately 9/1.

Oxidation for the Generation of the Pentazolate Anion 30 mL of hexafluoroisopropanol (HFIP) are added to a solution of NaOH (0.44 g, 11 mmol) in 30 mL of MeOH, then this mixture is cooled to −40° C. The phenolic arylpentazole precursor, stored at −40° C., is then added in one go. The oxidant iodosylbenzene (PhIO) (2.42 g) is added in portions, then the reaction medium is stirred for 24 hours at −40° C., then left to rise slowly to ambient temperature (20° C.). The solvents are evaporated until dry, then the residue is recovered with 100 ml of an $H_2O$/EtOAc (1/1 v/v) mixture. The aqueous phase is washed with 3*20 mL EtOAc then evaporated till dry (co-evaporation with ethanol). The solid thus obtained is analysed by high-resolution mass spectrometry (HRMS), chemical ionisation (CI) and $^{14}N$ NMR in order to confirm the presence of the pentazolate anion. The average mass content observed is approximately 5-10% nitrogen and the major contaminant is NaCl.

The reaction diagram below summarises the method for synthesising the pentazolate anion implemented in this example.

[Chem. 10]

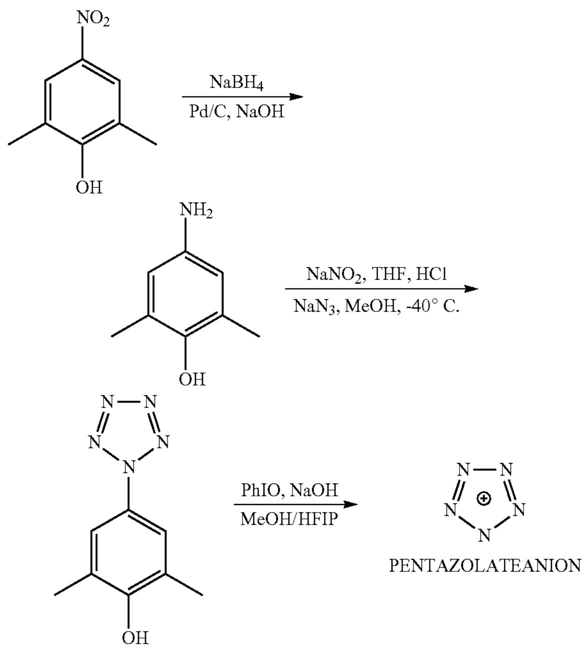

Purification of the Pentazolate Anion

The solid obtained previously after the oxidation (~1 g) is placed in suspension in 100 ml of an anhydrous solvent (acetonitrile or acetone). After stirring for 3 days, the solid is filtered, washed with small volumes of solvent, then the solvent is evaporated until dry. Between 50 and 80 mg of a yellowish solid is recovered. The analysis by $^{14}N$ NMR is used to determine a mass content of approximately 40 to 45% of pentazolate anion.

FIGS. 1 to 3 give the physicochemical characteristics of the resulting product and show the detection of the pentazolate anion. FIG. 1 is a result from an analysis by ionic chromatography. FIG. 2 is a result from an analysis by $^{14}N$ NMR showing a characteristic chemical shift (δ 367 ppm vs. $NH_3$, standard $NH_4Cl$ at δ 20 ppm). FIG. 3 is a result from an analysis by differential scanning calorimetry ("DSC") showing a decomposition temperature of approximately 110° C. in accordance with that described in the literature for $NaN_5{\cdot}xH_2O$ complexes with x between 2 and 3.

Other tests were carried out by varying the nature of the oxidant and of the solvent during the oxidation of phenolic arylpentazole and are listed in Table 1 below (the test denoted "Exp. 3" in the table below corresponds to the operating mode which will be described below). An operating mode identical to that described above was used for these tests replacing, as applicable, HFIP by $CH_3CN$ or TFE, and PhIO by PIDA.

TABLE 1

| Exp. | Oxidant | Solvent | Base | Gross m (g) | Mass N (%) | N5 (mmol) | Yield (%) |
|---|---|---|---|---|---|---|---|
| 1 | PIDA | MeOH—$CH_3CN$ | NaOH | 0.32 | 2.8 | 0.13 | 19.5 |
| 2 | PhIO | MeOH—TFE | NaOH | 1.74 | 1.3 | 0.32 | 8.7 |
| 3 | PhIO | MeOH—HFIP | NaOH | 1.76 | 7.8 | 1.93 | 52.5 |
| 4 | PIDA | MeOH—TFE | NaOH | 1.68 | 2.7 | 0.64 | 17.4 |
| 5 | PIDA | MeOH—HFIP | NaOH | 1.06 | 6.1 | 0.93 | 25.2 |
| 6 | PhIO | MeOH—HFIP | — | 0.45 | 2.7 | 0.17 | 4.8 |
| 7 | PhIO | MeOH—HFIP | NaOH | 1.73 | 6.3 | 1.55 | 34.8 |

Table 1 shows the effectiveness of the oxidants PhIO and PIDA in various solvents for obtaining the pentazolate anion. It can be seen that the removal of the base (Exp. 6) prevents the formation of the $N_5^-$ species and that the use of PhIO in an MeOH-HFIP solvent in the presence of NaOH gives an optimum result (Exp. 3) which is reproducible (Exp. 7).

Another series of tests was carried out using other oxidants and bases. The results are listed in Table 2 below. In this series of tests, the operating mode for oxidation is identical to that described above by replacing PhIO by $PhI(OMe)_2$ or IBX, HFIP by $CH_3CN$ or TFE and NaOH by MeONa, as applicable.

TABLE 2

| Exp. | Oxidant | Solvent | Base | Gross m (g) | Mass N (%) | N5 (mmol) | Yield (%) |
|---|---|---|---|---|---|---|---|
| 8 | $PhI(OMe)_2$ | MeOH—$CH_3CN$ | NaOH | 2.39 | 1.1 | 0.39 | 10.5 |
| 9 | $PhI(OMe)_2$ | MeOH—TFE | NaOH | 1.07 | 2.6 | 0.40 | 11.1 |
| 10 | $PhI(OMe)_2$ | MeOH—HFIP | NaOH | 1.65 | 3.4 | 0.80 | 21.9 |
| 11 | $PhI(OMe)_2$ | MeOH—TFE | MeONa | 1.16 | 6.2 | 1.02 | 27.9 |
| 12 | IBX | MeOH—$CH_3CN$ | NaOH | — | — | — | — |

Table 2 shows the effectiveness of the oxidant $PhI(OMe)_2$ in various solvents in order to generate the pentazolate anion. The possibility of using an alcoholate base (Exp. 11) should also be noted and the total ineffectiveness of IBX (Exp. 12) of the formula given below, an oxidant not within the scope of the invention of type I(V) (whereas the oxidants PIDA, PhIO and $PhI(OMe)_2$ are of type I(III)).

[Chem. 11]

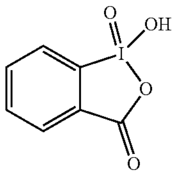

IBX

An oxidation test of phenolic arylpentazole using Koser's reagent of formula given below was also carried out using an ammonium hydroxide base and led to a yield of 25% for the oxidation step.

[Chem. 12]

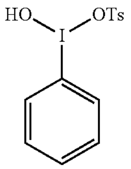

The expression "between . . . and . . . " should be understood as including the limits.

The invention claimed is:

1. A method for producing the pentazolate anion, comprising:

oxidation of a phenolic arylpentazole by a hypervalent iodine oxidant in the presence of a base, said hypervalent iodine oxidant being of general formula A-B, wherein group A designates a benzene ring, and group B is a structure comprising a hypervalent iodine atom having one of the two formulas B1 or B2 below:

[Chem. 13]

B1

[Chem. 14]

B2

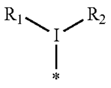

with *— designating, in the formulas B1 and B2, the bond of the hypervalent iodine atom to the benzene ring A, in formula B2, $R_1$ and $R_2$ being identical or different and chosen independently of one another from: —OCOR, —OR, where R designates a linear or branched, alkyl chain comprising between 1 and 4 carbon atoms, or $R_1$ being —OH and $R_2$ being —OTs with Ts designating a tosyl group, where **— designates the bond of the oxygen atom to the hypervalent iodine, the phenolic arylpentazole having the following chemical structure:

[Chem. 15]

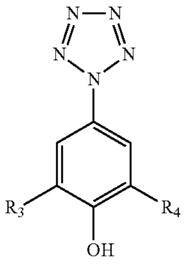

$R_3$ and $R_4$ being identical or different and chosen independently of one another from: the, linear or branched, alkyl chains comprising between 1 and 4 carbon atoms, not substituted or substituted by a $C_1$ or $C_2$ alkoxy group or by a dialkylamine.

2. The method according to claim 1, wherein the oxidation is carried out in a solvent comprising hexafluoroisopropanol and at least one compound chosen from alcohols or acetonitrile.

3. The method according to claim 1, wherein group B is of formula B1.

4. The method according to claim 3, wherein group B is of formula B1 and the oxidation is carried out in a solvent comprising hexafluoroisopropanol and at least one compound chosen from alcohols or acetonitrile.

5. The method according to claim 1, wherein group B is of formula B2 with $R_1$ and $R_2$ identical and each designating —OCOMe or —OMe, where Me designates a methyl group.

6. The method according to claim 1, wherein the base comprises at least one compound chosen from: an alkali hydroxide, an alkaline-earth hydroxide, a metal hydroxide, ammonium hydroxide, a quaternary ammonium hydroxide, an alkali carbonate or a mixture of these compounds.

7. The method according to claim 6, wherein the base is sodium hydroxide.

8. The method according to claim 1, wherein the oxidation is carried out in a solvent and wherein the method further comprises, successively:

removal of the solvent, liquid-liquid extraction, using an extraction solvent, in order to remove the oxidant residues, removal of the extraction solvent, and selective extraction of the pentazolate anion after this removal, the pentazolate anion being selectively extracted in a liquid medium comprising at least one of ethanol, acetonitrile or acetone, or a mixture of these compounds.

9. A method for producing an energetic composition, comprising at least the production of the pentazolate anion by a method according to claim 1, and mixing of the pentazolate anion thus produced with a binder in order to obtain the energetic composition.

* * * * *